Patented Aug. 6, 1929.

1,723,043

UNITED STATES PATENT OFFICE.

ROBERT R. KENWORTHY, OF PHILADELPHIA, PENNSYLVANIA.

METHOD OF MAKING CONCRETE BLOCKS.

No Drawing. Application filed July 9, 1926, Serial No. 121,499. Renewed December 21, 1928.

The principal objects of the present invention, are, first, to provide dense, coherent, non-absorbent concrete material which in block form resembles natural stone and which may be variously colored as desired; second, to provide concrete which in respect to known concrete is stronger in compression and in tension, is characterized by crystalline structure in greater degree, is capable of withstanding a greater degree of heat and possesses a lower coefficient of expansion and contraction under temperature changes; and third, to provide an expeditious method of producing concrete of the character described.

According to my invention use is made along with cement of a mineral aggregate of at least two different sizes including fine or impalpable powder, and all of the water that is employed is added initially and at the same time. The cement therefore acts upon a comparatively large surface and when the mixture is tamped in a mold the cement and finer portion of the aggregate came to the surface setting and forming a skin which opposes the evaporation of water from the interior and also excludes water from the interior. The water confined in the interior causes the admixture in the interior to remain plastic or pasty for a period of time, perhaps several days, and when it sets it remains a crystalline structure in comparatively great degree. After the molded concrete has set, for example, after twenty or thirty days, more or less, the molded block can be split presenting the appearance of stone and, if desired, concrete can be dressed like stone. The fine or impalpable powder may consists of ground mineral coloring matter, as lava, so that different color effects can be produced.

For the sake of further description I will describe the manufacture of the product.

In selecting or preparing the mineral aggregate there must be two or more sizes of which one is a very fine powder and of which the others by way of example may be of the size of fine sand or larger. The aggregate containing the impalpable powder, with or without mineral coloring matter, and the cement are mixed together and to the mixture is added the appropriate quantity of water which is all initially added and no water need thereafter be added. The material is mixed as in a batch mixer and then poured into a frame or mold and rammed or tamped. If desired the mold may be devoid of a bottom board and a top board and may rest upon the ground. There is formed in fifteen minutes, more or less, a skin which is due to the cement and finer portions of the aggregate coming to and setting at the surface, and this skin retains water in the interior of the mass so that the latter is plastic and pasty. The mold may then be removed and the molded mass allowed to remain for three or four weeks, more or less, prior to use. If desired the block may then be split which in the case of six sided rectangular blocks produces a stonelike appearance.

It will be obvious to those skilled in the art that modifications may be made in details of procedure and in mere choice of materials without departing from the spirit of the invention which is not limited to those matters or otherwise than as the prior art and the appended claim may require.

I claim:

The method of making dense, coherent, non-absorbent concrete which comprises mixing cement and a mineral aggregate of at least two sizes and including a fine powder, initially adding all the water that is ever added and mixing, forming an outer skin of cement and finer portion of the aggregate upon the mass by molding and tamping thereby confining water in the interior, permitting the interior to set, and splitting the mass to provide a surface resembling stone.

ROBERT R. KENWORTHY.